(12) United States Patent
Egan

(10) Patent No.: US 6,881,901 B2
(45) Date of Patent: Apr. 19, 2005

(54) CONNECTION COVER

(76) Inventor: Fallon Egan, 1800 Sherwood Forest, Bldg. D1, Houston, TX (US) 77043

( * ) Notice: Subject to any disclaimer, the term of this patent is extended or adjusted under 35 U.S.C. 154(b) by 0 days.

(21) Appl. No.: 10/645,212

(22) Filed: Aug. 21, 2003

(65) Prior Publication Data

US 2005/0039940 A1 Feb. 24, 2005

(51) Int. Cl.$^7$ .................................................. H02G 3/18
(52) U.S. Cl. .................... 174/65 R; 174/72 C; 174/135; 16/2.1
(58) Field of Search .............................. 174/65 R, 72 C, 174/91, 135; 248/56, 65 SS; 16/2.1, 2.2

(56) References Cited

U.S. PATENT DOCUMENTS

| | | | |
|---|---|---|---|
| 3,576,937 A | 5/1971 | Eldridge | 174/92 |
| 3,852,516 A | 12/1974 | Vander Ploog et al. | 174/71 |
| 4,015,072 A | 3/1977 | Gillemot | 174/92 |
| 4,538,869 A | 9/1985 | Richards | 339/59 |
| 4,643,505 A | 2/1987 | House et al. | 339/75 |
| 4,736,072 A | 4/1988 | Hvidsten | 174/93 |
| 4,902,856 A | 2/1990 | Miller | 174/91 |
| 5,266,740 A | * 11/1993 | Hsu | 174/72 C |
| 5,313,546 A | 5/1994 | Toffetti | 385/135 |
| 5,397,859 A | 3/1995 | Robertson et al. | 174/92 |
| 5,561,269 A | 10/1996 | Robertson et al. | 174/92 |
| 5,656,797 A | * 8/1997 | Lin | 174/91 |
| 5,684,911 A | 11/1997 | Burgett | 385/135 |
| 5,825,963 A | 10/1998 | Burgett | 385/135 |
| 6,036,525 A | 3/2000 | Alfis, III | 439/367 |
| 6,036,526 A | 3/2000 | Alfis, III | 439/367 |
| 6,194,659 B1 | 2/2001 | Cornu | 174/65 |
| 6,303,870 B1 | * 10/2001 | Nazaryan et al. | 174/172 |

* cited by examiner

Primary Examiner—Dhiru R. Patel
(74) Attorney, Agent, or Firm—Conley Rose, P.C.

(57) ABSTRACT

The connection cover can be for any type of connection that requires a cover, such as television, fiber optic, or cellular telephone antenna cable connection. An embodiment of the on cover includes a generally cylindrical body formed by two main body sections for protecting the connection. The two main body sections, when assembled, form two openings, allowing access to the open chamber within the cover. Connectors engage the main body sections. Once the connection is made, the main body sections are then placed on either side of the connection with the connection members extending from the cover openings. The two main body sections are then engaged by the main body section connectors.

23 Claims, 9 Drawing Sheets

CONNECTION COVER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to a connection cover. More particularly, the present invention relates to a cable connection cover.

2. Description of the Related Art

Electrical cables can be connected or spliced by mechanically connecting the conductors of the cables, enclosing the connected conductors with a fluid or moldable electrically insulating material, such as butyl tape or cold and heat shrinks, and then covering the material with an outer covering layer to protect the splice. The use of a fluid or flowable plastic material to cover the splice forms a moisture-proof connection. The outer covering layer typically has its ends sealed or clamped to the cable to additionally seal the interior of the splice against moisture.

SUMMARY OF THE EMBODIMENTS

One embodiment of the connection cover comprises a generally cylindrical body formed by two main body sections. The two main body sections, when assembled, form two openings on either end of the cover, allowing access to the open chamber within the cover. Connectors engage the main body sections along contact edges. The dimensions of the main body sections are sized depending on the size of the connection and connection members to be protected. Once the connection is made, the main body sections are then placed on either side of the connection with the connection members extending from the cover openings. The two sections are then engaged by the main body section connectors to form a cover for the connection.

In a second embodiment, two gaskets engage the two main body sections to form a seal between the contact edges when the connection cover is assembled. The gaskets also engage the main body opening surfaces. For assembly, the gaskets are engaged with each respective main body section before the sections are engaged around the connection. The two main body sections are then connected to form a moisture-proof seal between the contact edges of the main body sections. The gaskets also form a moisture-proof seal around the connection members for protecting the connection inside the connection cover.

In a third embodiment, the connection cover may have more than two openings for protecting connections with more than two connection members.

The invention comprises a combination of features and advantages that enable it to overcome various problems of prior devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENT

The present invention relates generally to a connection cover and is susceptible to embodiments of different forms. The drawings and the description below disclose in detail a specific embodiment of the present invention with the understanding that this disclosure is to be considered an exemplification of the principles of the invention, and is not intended to limit the invention to that illustrated and described in the disclosure. Further, it is to be fully recognized that the different teachings of the embodiments discussed below may be employed separately or in any suitable combination to produce desired results.

Figure 1:
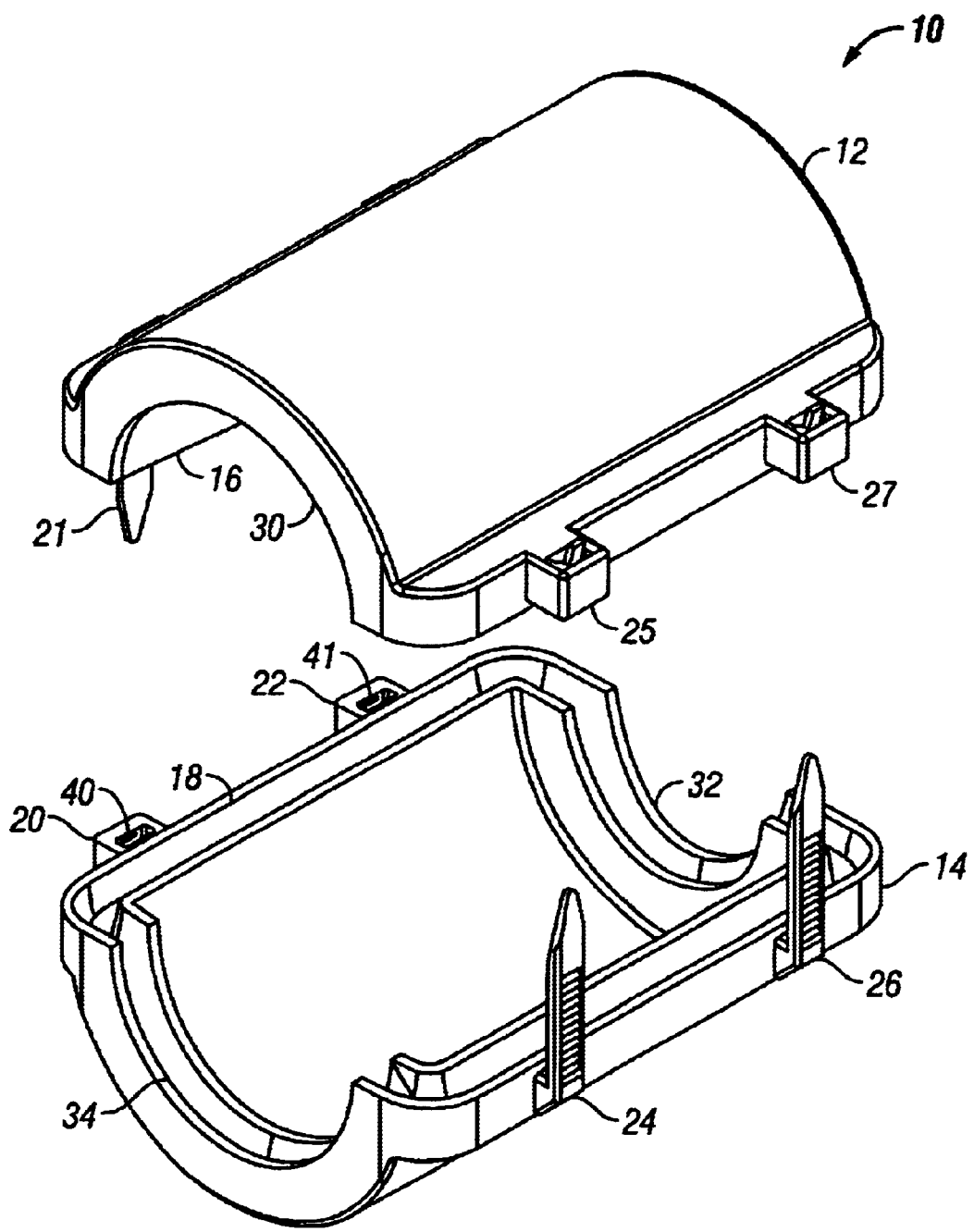
FIG. 1 is a perspective view of a disassembled connection cover.
Figure 2:
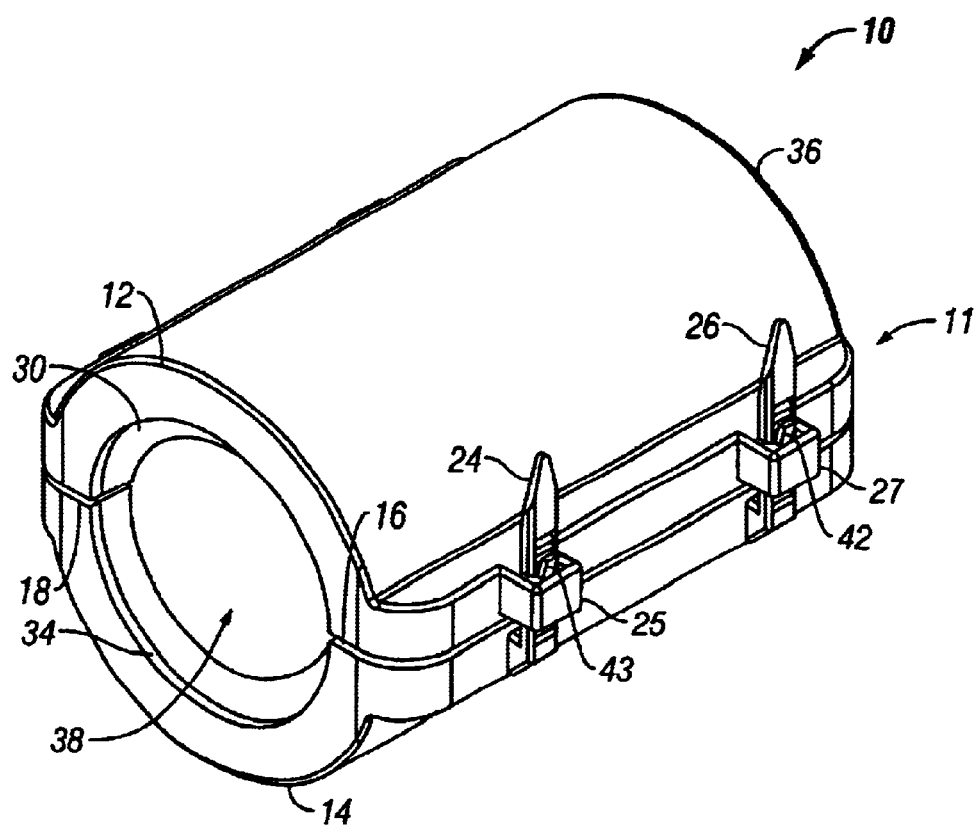
FIG. 2 is a perspective view of an assembled connection cover in accordance with the embodiment in FIG. 1.
Figure 3:
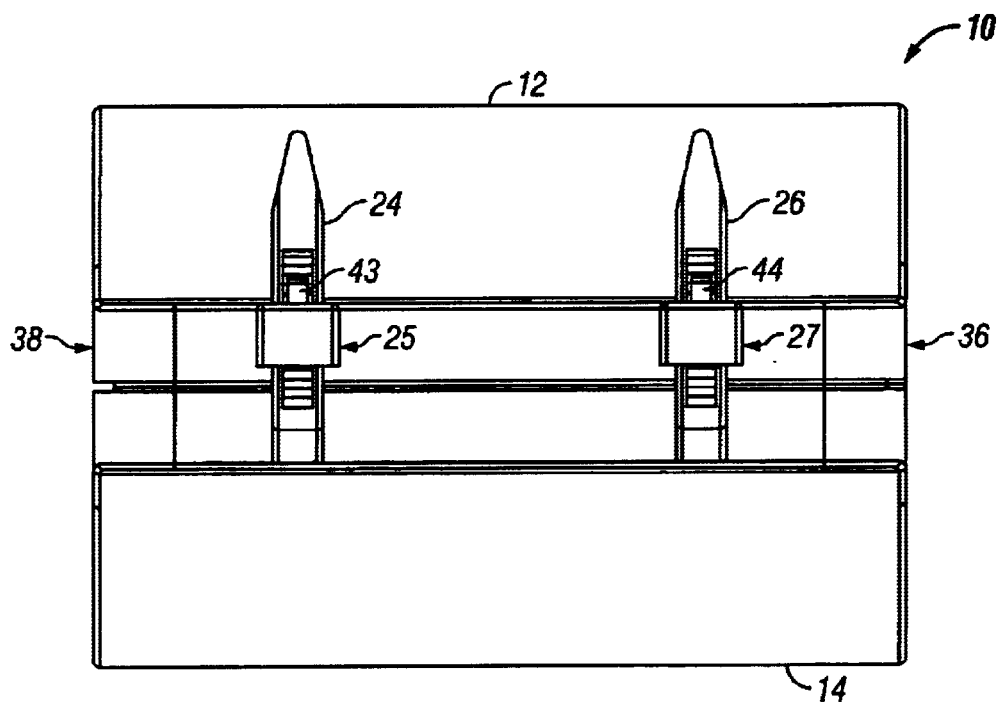
FIG. 3 is a side elevation view of an assembled connection cover in accordance with the embodiment in FIG. 1.
Figure 4:
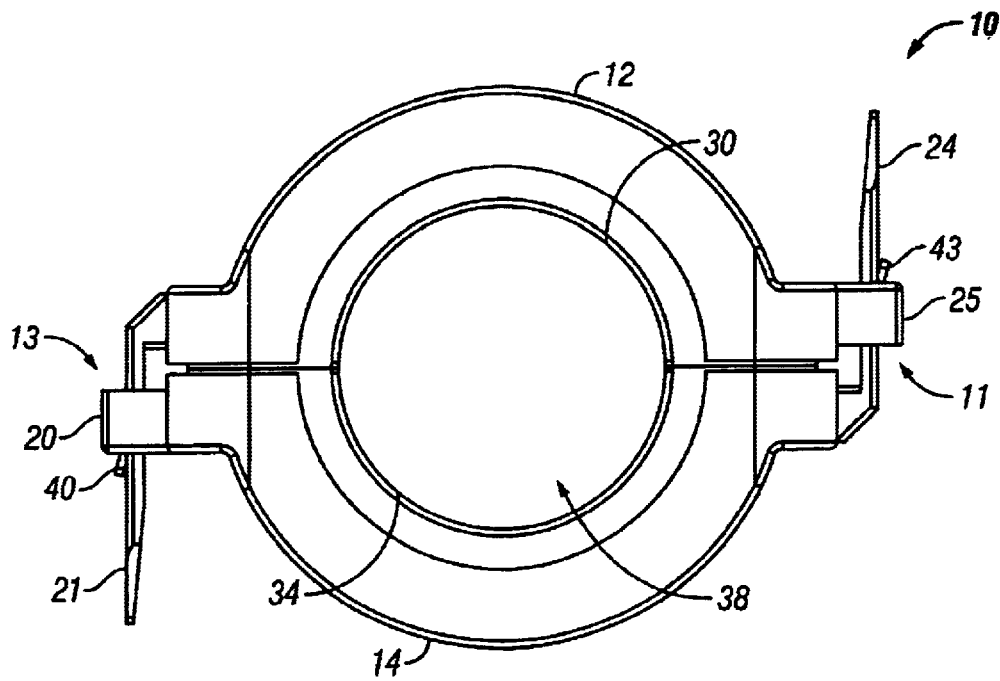
FIG. 4 is a front elevation view of an assembled connection cover in accordance with the embodiment in FIG. 1.
Figure 5:
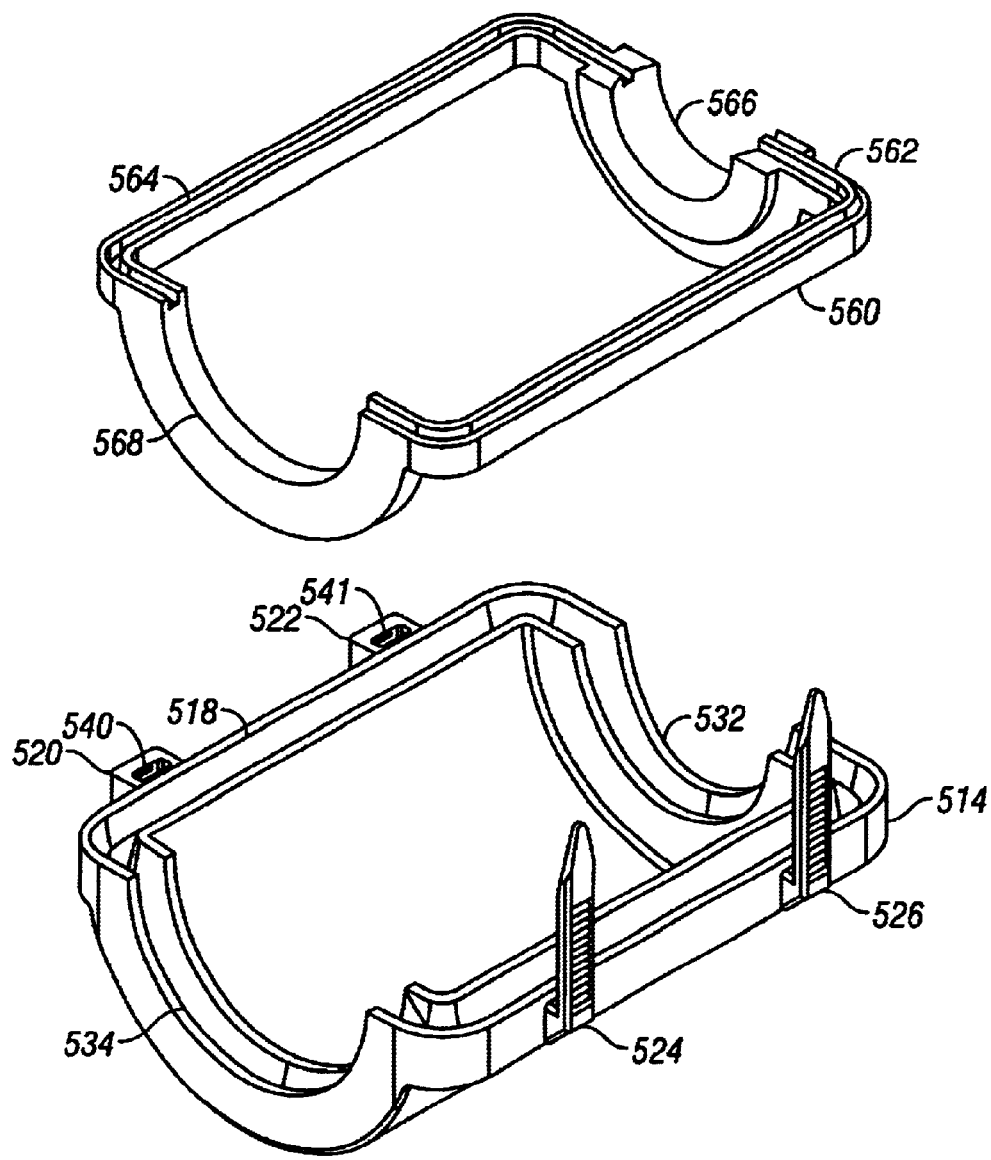
FIG. 5 is a perspective view of another embodiment of a disassembled connection cover showing a connection cover section and a gasket.
Figure 6:
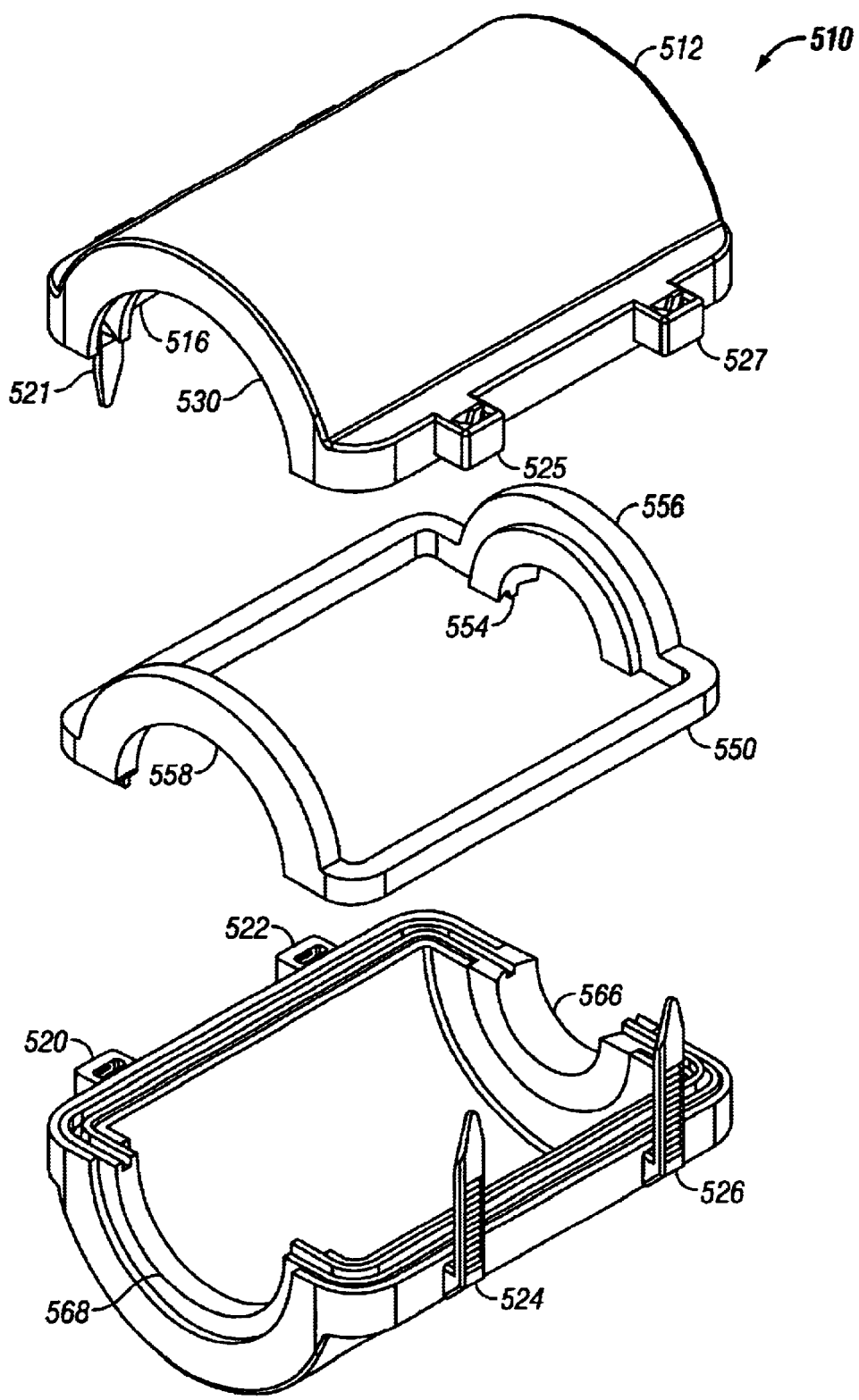
FIG. 6 is a perspective view of a disassembled connection cover showing an assembled connection cover section and gasket and a disassembled connection cover section and gasket in accordance with the embodiment shown in FIG. 5.
Figure 7:
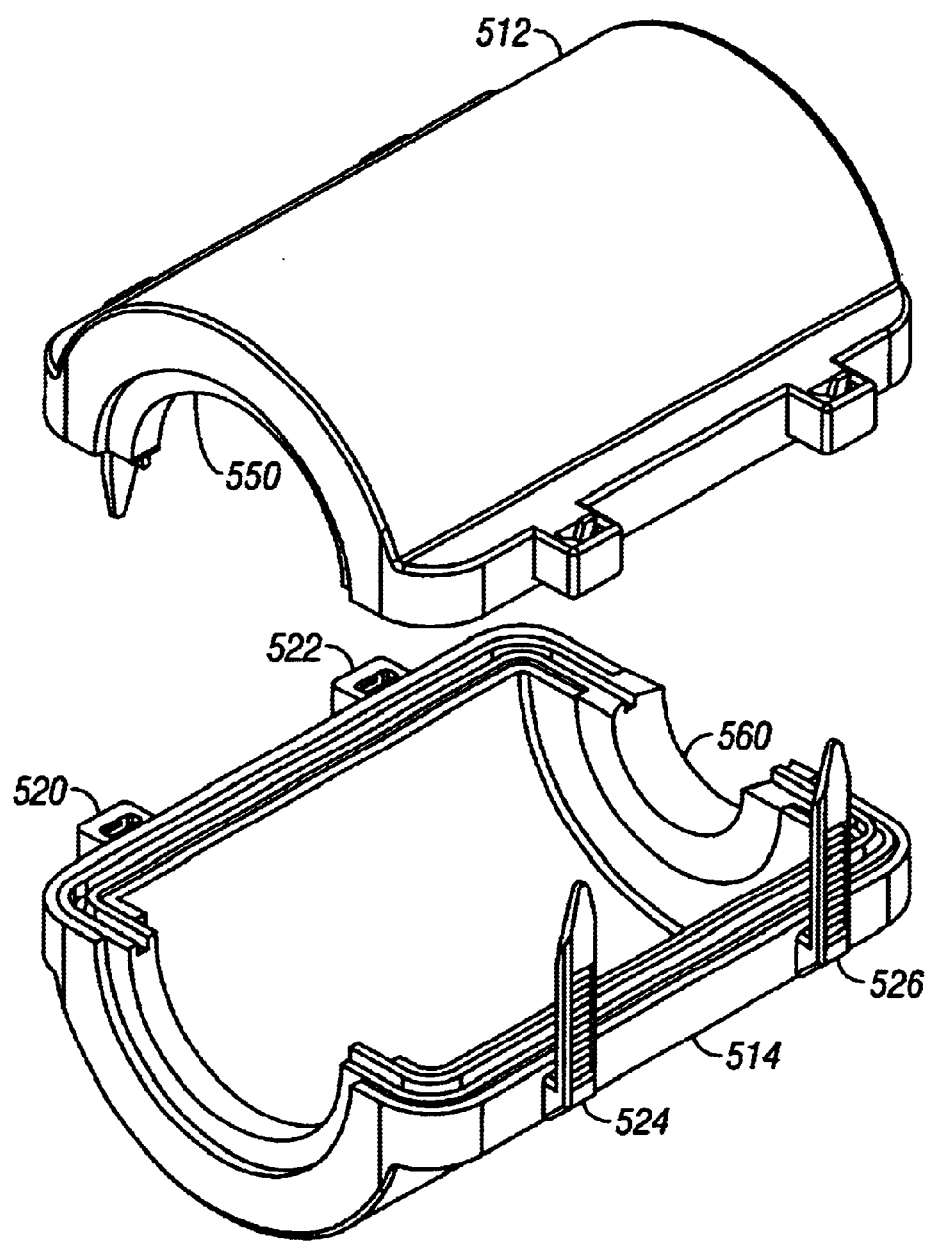
FIG. 7 is a perspective view of a disassembled connection cover showing two assembled connection cover sections in accordance with the embodiment shown in FIG. 5.
Figure 8:
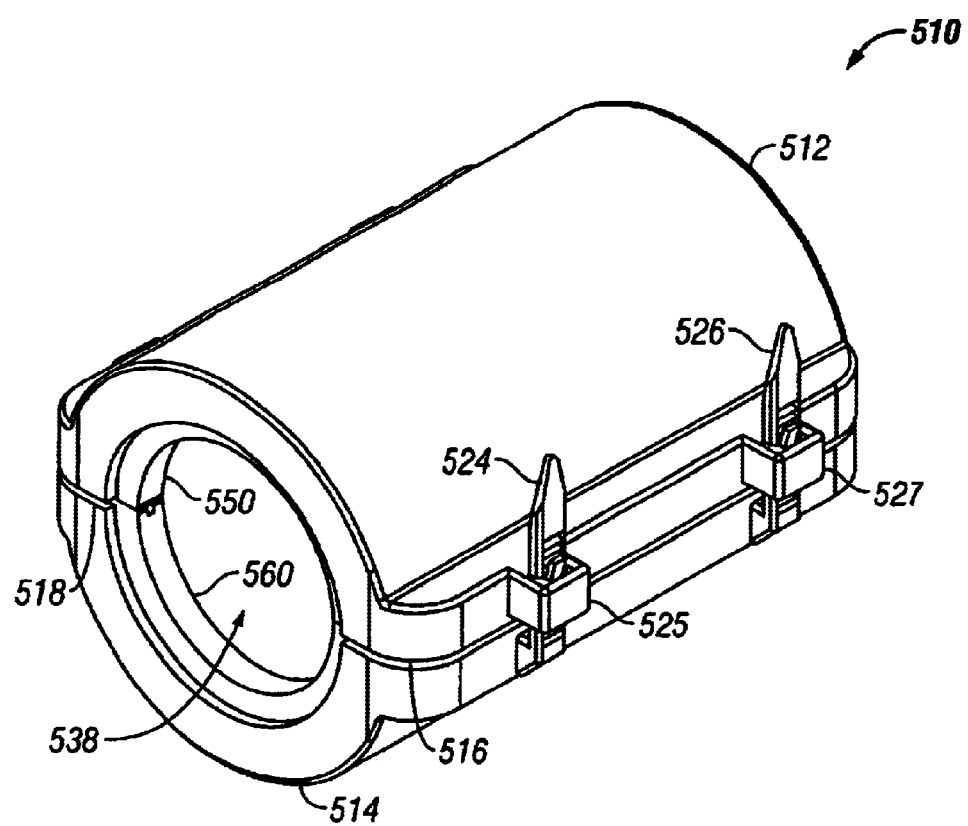
FIG. 8 is a perspective view of an assembled connection cover in accordance with the embodiment shown in FIG. 5.

FIGS. 1–4 show a connection cover 10 generally cylindrical in shape with a hollow interior. The connection cover 10 comprises two main body sections 12, 14, designed to engage each other for assembly around a cable connection or other type of connection needing protection. The main body sections 12, 14 each comprise a contact surface 16, 18, respectively, that engage when the connection cover 10 is assembled. The main body sections 12, 14 further comprise connectors, such as first connector 11 and second connector 13, as shown in FIGS. 2 and 4, for engaging the main body sections 12, 14 together. Each connector comprises a receptor with a releasing tab as well as an insert. As shown in FIGS. 1–4, the connectors comprise receptors 25, 27 with releasing tabs 42, 43 as well as inserts 21, 23 on the main body section 12. The connectors also comprise receptors 20, 22 with releasing tabs 40, 41 as well as inserts 24, 26 on the main body section 14. The receptors 20, 22, 25, 27 releasably engage the connector inserts 21, 23, 24, 26, respectively, such that adjusting the releasing tabs 40–43 releases the inserts 21, 23, 24, 26 from engagement. Any suitable number and type of connectors may be used to ensure the proper assembly of the connection cover 10. The main body sections 12, 14 also each comprise two semi-opening surfaces 28, 30, 32, 34, respectively, that form main body side openings 36, 38 when the connection cover 10 is assembled.

FIGS. 2–4 show a fully assembled connection cover 10. Once the connection to be protected has been made, the main body sections 12, 14 are engaged around the connection by inserting the inserts 21, 23, 24, 26 into the receptors 20, 22, 25, 27 and locking them into position. When assembled, the opening surfaces 28, 30, 32, 34 form the openings 36, 38 that allow the cables or connectors to extend from the connection cover 10. The openings 36, 38 may be designed for whatever size and shape needed to allow the cables or connectors to extend from the connection cover 10. The openings 36, 38 may also be different sizes and shapes from each other. Once assembled, the connection cover 10 thus fully covers and protects the cable connection. The releasable tabs 40–43 also allow the connection cover 10 to be disassembled and removed from the connection being protected, such as when maintenance or testing must be performed on the connection.

FIGS. 5–9 show a second embodiment 510 of the connection cover. The connection cover 510 is similar to the connection cover 10 and operates in a similar manner. Thus connection cover 510 is also generally cylindrical in shape with a hollow interior. The connection cover 510 also comprises two main body sections 512, 514, designed to engage each other for assembly around a cable connection or other type of connection needing protection. The main body sections 512, 514 also each comprise a contact surface 516, 518, respectively, that engage when the connection cover 510 is assembled. The main body sections 512, 514 further comprise connectors for engaging the main body sections 512, 514 together. Each connector comprises a receptor with a releasing tab as well as an insert. As shown in FIGS. 5–8, the connectors comprise receptors 525, 527 with releasing tabs 542, 543 as well as inserts 521, 523 on the main body section 512. The connectors also comprise receptors 520, 522 with releasing tabs 540, 541 as well as inserts 524, 526 on the main body section 514. The receptors 520, 522, 525, 527 releasably engage the connector inserts 521, 523, 524, 526, respectively, such that adjusting the releasing tabs 540–543 releases the inserts 521, 523, 524, 526 from engagement. Any suitable number and type of connectors may be used to ensure the proper assembly of the connection cover 510. The main body sections 512, 514 also each comprise two opening surfaces 528, 530, 532, 534, respectively, that form main body openings 536, 538 when the connection cover 510 is assembled.

In addition, connection cover 510 comprises gaskets 550, 560 that engage the surfaces 516, 518, respectively, of the main body sections 512, 514. The gaskets 550, 560 comprise tongue sections 552, 562, respectively, designed to mate with groove sections 554, 564, respectively, when the connection cover 510 is assembled. The gaskets 550, 560 also comprise opening surfaces 556, 558, 566, 568 that engage the main section opening surfaces 528, 530, 532, 534, respectively.

Once the connection to be protected has been made, the main body sections 512, 514 with the gaskets 550, 560 in place are engaged around the connection by inserting the inserts 521, 523, 524, 526 into the receptors 520, 522, 525, 527 and locking them into position. When assembled, the opening surfaces 528, 530, 532, 534 form the openings 536, 538 to allow the cables or connectors to extend from the connection cover 510. The openings 536, 538 may be designed for whatever size and shape needed to allow the cables or connectors to extend from the connection cover 510. The openings 536, 538 may also be different sizes and shapes from each other. The gaskets 550, 560 form a moisture-proof seal between the two main body sections 512, 514 along the edges 516, 518 when the connection cover 510 is assembled. The gaskets 550, 560 also engage the cables or connectors extending through the openings 536, 538. The gaskets thus also form a moisture-proof seal around the cables or connectors for protecting the connection inside the connection cover 510. The releasable tabs 540–543 also allow the connection cover 510 to be disassembled and removed from the connection being protected, such as when maintenance or testing must be performed on the connection.

Figure 9:
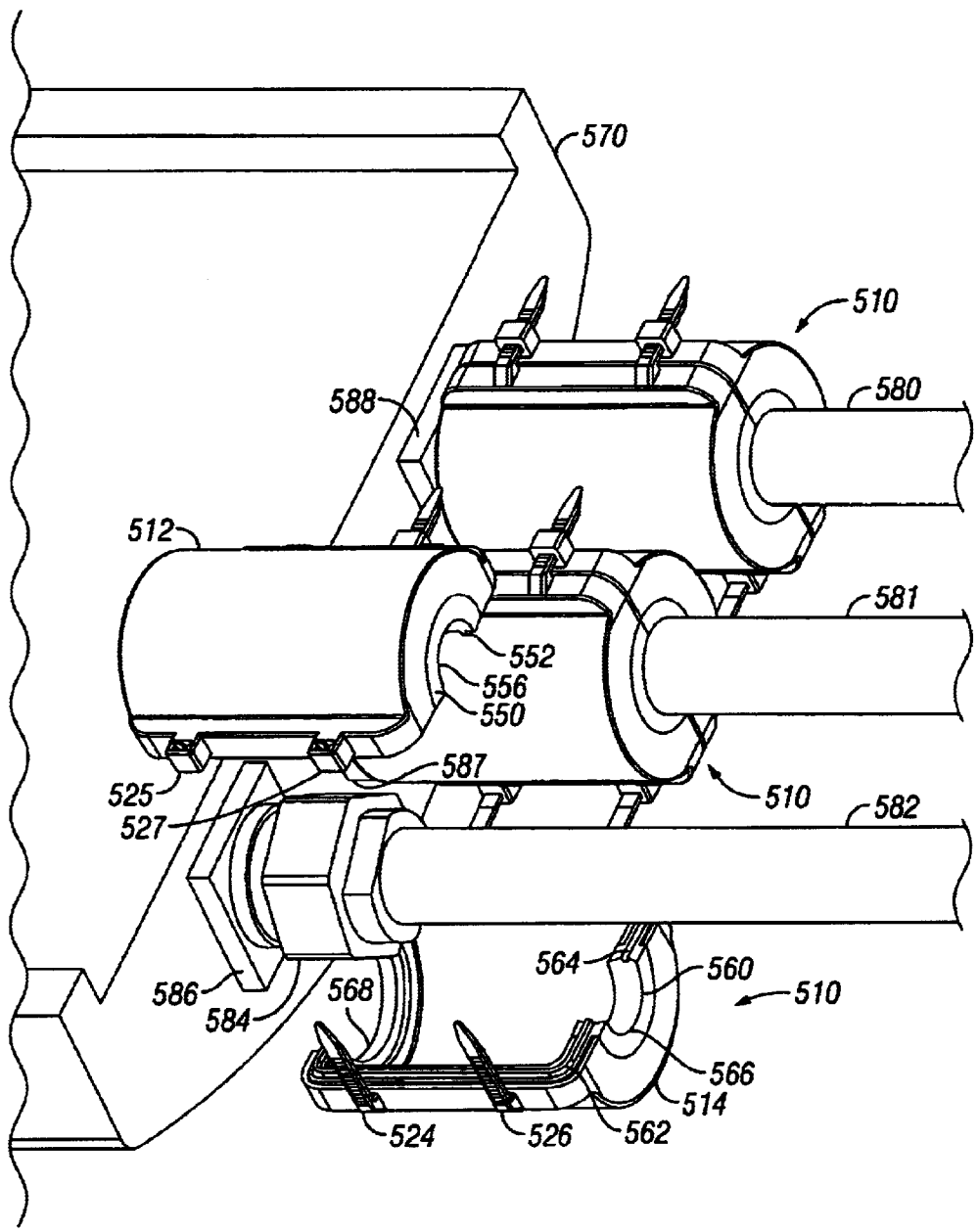
FIG. 9 is a perspective view showing connection covers assembled onto a cellular telephone antenna in accordance with the embodiment shown in FIG. 5.

FIG. 9 shows an example of three connection covers 510 protecting connections between a cellular telephone antenna 570 and cellular telephone antenna cables 580, 581, 582. The connections to be protected are the connection between the antenna connectors 586–588 and the antenna cables 580–582, respectively. The cables 580–582 are connected to the antenna connectors 586–588 using cable connectors 584. Once the connection between the antenna connector 586 and the cable connector 584 is made, the two main body sections 512, 514 may then be assembled by inserting the inserts 521, 523, 524, 526 into the receptors 520, 522, 525, 527 and locking them into position. The gaskets 550, 560 form a moisture-proof seal between the two body sections 512, 514 along the edges 516, 518 when the connection cover 510 is assembled. The gaskets 550, 560 also engage the cables 580–582 and antenna connectors 586–588 extending through the openings 536, 538. The gaskets 550, 560 thus also form a moisture-proof seal around the cables 580–582 and antenna connectors 586–588 for protecting the connection inside the connection cover 510. The releasable tabs 540–543 also allow the connection cover 510 to be disassembled and removed from the antenna cable connection being protected, such as when maintenance or testing must be performed on the connection. The above example is for illustrative purposes only and is not intended to limit the scope of the claims in any way.

Figure 10:
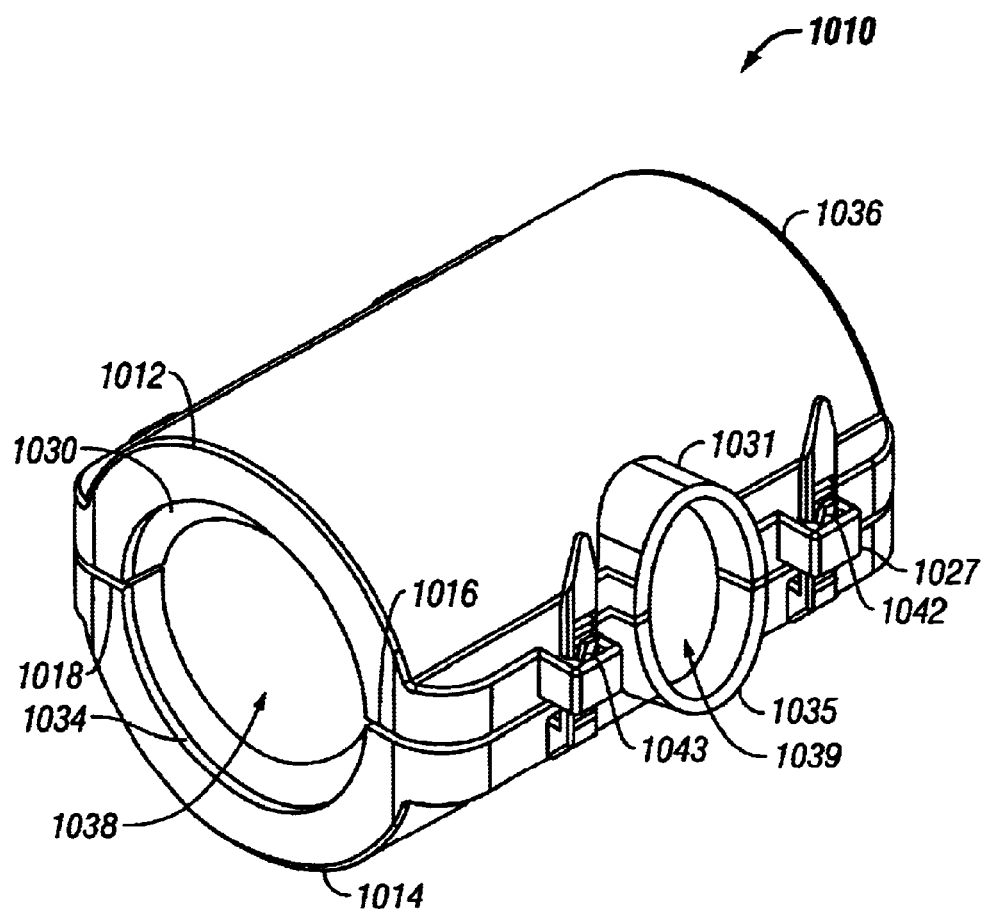
FIG. 10 is a perspective view of another embodiment of an assembled connection cover.

FIG. 10 shows a third embodiment 1010 of the connection cover. For convenience, the connection cover 1010 will be described in terms of connection cover 10. However, the connection cover 1010 can operate in a similar manner and have similar parts to either the connection cover 10 or 510. In addition to the components of the connection cover 10, the connection cover 510 further comprises more than two opening surfaces on each main body section 1012, 1014. Any suitable number of opening surfaces may be used. FIG. 10 shows the main body section 1012 with opening surfaces 1028, 1030, and also 1031. The main body section 1014 also comprises opening surfaces 1032, 1034, and also 1035. Thus, when assembled, the connection cover 1010 comprises three openings 1036, 1038, 1039. The connection cover 1010 may thus be used to protect a connection with more than two connection members, with each connection member extending from the openings 1036, 1038, 1039.

While different embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described herein, but is only limited by the claims that follow, the scope of which shall include all equivalents of the subject matter of the claims.

What is claimed is:

1. A connection cover for at least two connection members comprising:

a first main body section comprising at least one opening;

a second main body section comprising at least one opening;

first and second connectors adapted to engage the first and second main body sections, wherein the first connector and second connector are releasably engagable, each connector comprising an insert and a receptor adapted to receive the insert, the receptor comprising a releasing tab adapted to release the insert; and the openings allowing the at least two connection members to extend from the first and second main body sections when the first and second main body sections are engaged.

2. The connection cover of claim 1 wherein the connection cover is generally cylindrical in shape.

3. The connection cover of claim 1 further comprising more than one first connector and more than one second connector.

4. The connection cover of claim 1 wherein the first and second main body sections comprise more than one opening allowing more than two connection members to extend from the first and second main body sections.

5. The connection cover of claim 1 wherein the at least two connection members comprise cables comprising cable connectors adapted to connect the cables.

6. The connection cover of claim 1 wherein the at least two connection members comprise a cable comprising a cable connector and a cellular telephone antenna comprising an antenna connector adapted to connect to the cable connector.

7. The connection cover of claim 1 further comprising first and second gaskets adapted to form a moisture-proof seal between the contact surfaces of the first and second main body sections as well as between the first and second main body section opening surfaces and the at least two connection members.

8. The connection cover of claim 7 wherein each gasket further comprises a tongue section adapted to engage a corresponding groove section of the other gasket.

9. A connection cover for at least two connection members comprising:

a first main body section comprising at least one opening;

a second main body section comprising at least one opening;

first and second connectors adapted to engage the first and second main body sections;

the openings allowing the at least two connection members to extend from the first and second main body sections when the first and second main body sections are engaged; and first and second gaskets adapted to form a moisture-proof seal between the contact surfaces of the first and second main body sections as well as between the first and second main body section opening surfaces and the connection members, each gasket further comprising a tongue section adapted to engage a corresponding groove section of the other gasket.

10. A connection cover for at least two connection members comprising:

a first main body section comprising at least one opening;

a second main body section comprising at least one opening;

first and second connectors adapted to engage the first and second main body sections, wherein the first connector and second connector are releasably engageable, each connector comprising an insert and a receptor adapted to receive the insert, the receptor comprising a releasing tab adapted to release the insert;

the openings allowing the at least two connection members to extend from the first and second main body sections when the first and second main body sections are engaged; and first and second gaskets adapted to form a moisture-proof seal between the contact surfaces of the first and second main body sections as well as between the first and second main body section opening surfaces and the at least two connection members.

11. The connection cover of claim 10 wherein the connection cover is generally cylindrical in shape.

12. The connection cover of claim 10 further comprising more than one first connector and more than one second connector.

13. The connection cover of claim 10 wherein the first and second main body sections comprise more than one opening allowing more than two connection members to extend from the first and second main body sections.

14. The connection cover of claim 10 wherein the at least two connection members comprise cables comprising cable connectors adapted to connect the cables.

15. The connection cover of claim 10 wherein the at least two connection members comprise a cable comprising a cable connector and a cellular telephone antenna comprising an antenna connector adapted to connect to the cable connector.

16. The connection cover of claim 10 wherein each gasket further comprises a tongue section adapted to engage a corresponding groove section of the other gasket.

17. A connection cover for at least two connection members comprising:

a first main body section comprising at least one opening;

a second main body section comprising at least one opening;

first and second connectors adapted to releasably engage the first and second main body sections, each connector comprising an insert and a receptor adapted to receive the insert, the receptor comprising a releasing tab adapted to release the insert;

the openings allowing the at least two connection members to extend from the first and second main body sections when the first and second main body sections are engaged; and first and second gaskets adapted to form a moisture-proof seal between the contact surfaces of the first and second main body sections as well as between the first and second main body section opening surfaces and the connection members.

18. The connection cover of claim 17 wherein the connection cover is generally cylindrical in shape.

19. The connection cover of claim 17 further comprising more than one first connector and more than one second connector.

20. The connection cover of claim 17 wherein the first and second main body sections further comprise more than one opening allowing more than two connection members to extend from the first and second main body sections.

21. The connection cover of claim 17 wherein the at least two connection members comprise cables comprising cable connectors adapted to connect the cables.

22. The connection cover of claim 20 wherein the at least two connection members comprise a cable comprising a cable connector and a cellular telephone antenna comprising an antenna connector adapted to connect to the cable connector.

23. The connection cover of claim 17 wherein each gasket further comprises a tongue section adapted to engage a corresponding groove section of the other gasket.

* * * * *